J. & E. P. Miles,
Plow Cleaner.
No. 91,957. Patented June 29, 1869.
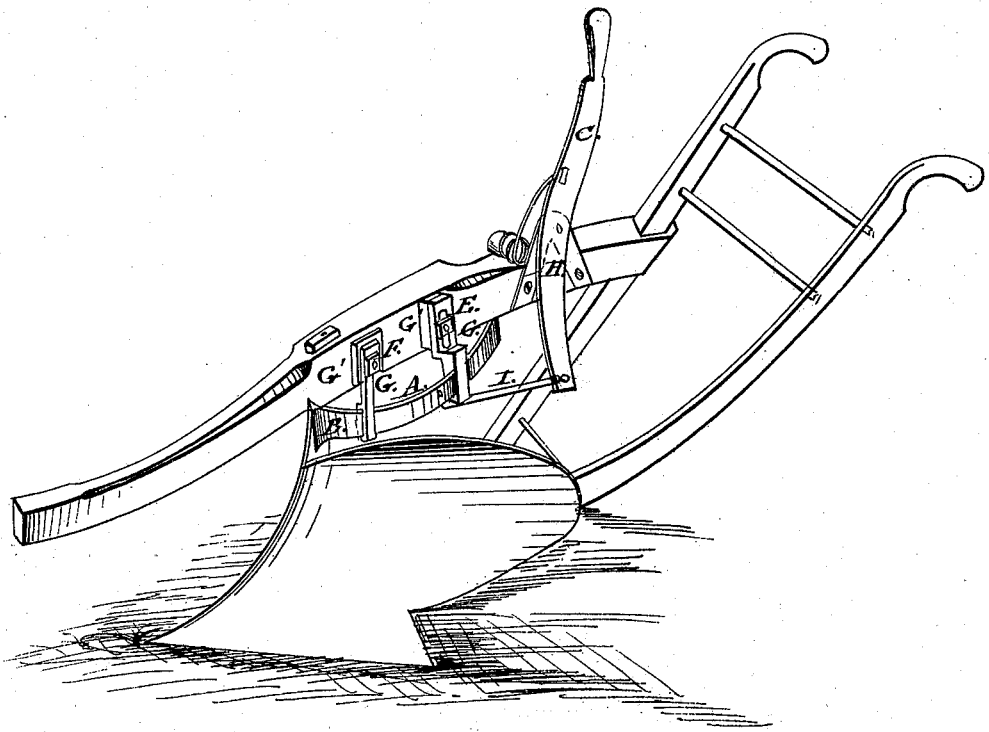

United States Patent Office.

J. MILES AND E. P. MILES, OF PLEASANT HILL, OHIO.

Letters Patent No. 91,957, dated June 29, 1869.

IMPROVEMENT IN PLOW-CLEANER.

The Schedule referred to in these Letters Patent and making part of the same.

*To all whom it may concern:*

Be it known that we, J. MILES and E. P. MILES, of Pleasant Hill, in the county of Miami, and State of Ohio, have invented a new and useful Improvement in Plow-Cleaners; and we do hereby declare that the following is a full, clear, and exact description thereof, which will enable others skilled in the art to make and use the same, reference being had to the accompanying drawing, forming part of this specification.

This invention relates to improvements in plow-cleaning devices, such as patented by us, January 8, 1867, and numbered 61,083, the object being to make the apparatus therein described applicable for attachment, so as to be readily removed from one side to another of any plow, also for adjustment vertically, as hereinafter more fully specified.

The drawing represents a perspective view of a plow, with our improved cleaner applied to it.

Similar letters of reference indicate corresponding parts.

A represents a curved bar of metal, or other suitable substance, having a widened end, B, and supported in brackets G', depending from the side of the plow-beam, in a manner to slide freely into the corner between the lower face of the beam and the front of the coulter, where the clogging takes place, to force the gathered and clogging matters away.

The said bar is so formed and the brackets so placed, that the discharging-end B, of the said bar, curves around, crossing the plane of the said coulter.

The discharger is operated by a hand-lever, C, pivoted to the beam, and provided with a spring to force it back.

Our present improvement consists in constructing the brackets E F, so that they may be adjusted on the beam, as to height, by making the slotted holes in the top thereof for the holding-bolts; also in arranging them for application to either side of the plow, by the employment of holding-bolts G, which may be readily screwed into the wood or out, and the provision of holes for them on either side of the beam; also, in providing a similar arrangement for changing the support H, for the operating-lever.

The bar A is taken out of the brackets, and adjusted with the bottom edge up, when changed to the other side of the beam, and the connection of the rod I, to the said bar, is such as to be as readily connected either way.

If preferred, the lever C may remain permanently on one side, and the rod I passed under the beam and connected to the bar A, when the latter is on the side opposite to the lever C.

Having thus described our invention,

What we claim as new, and desire to secure by Letters Patent, is—

The combination, with a plow, of the curved sliding cleaning-bar A, when arranged to be adjusted vertically, and from side to side of the beam, substantially as specified.

J. MILES.
E. P. MILES.

Witnesses:
R. R. CHASE,
L. F. NILES.